(12) United States Patent
Kato et al.

(10) Patent No.: US 7,773,364 B2
(45) Date of Patent: Aug. 10, 2010

(54) METHOD OF MANUFACTURING CAPACITOR

(75) Inventors: Tomohiko Kato, Tokyo (JP); Yuko Saya, Tokyo (JP); Osamu Shinoura, Tokyo (JP)

(73) Assignee: TDK Corporation, Tokyo (JP)

(*) Notice: Subject to any disclaimer, the term of this patent is extended or adjusted under 35 U.S.C. 154(b) by 113 days.

(21) Appl. No.: 11/779,597

(22) Filed: Jul. 18, 2007

(65) Prior Publication Data

US 2008/0072409 A1 Mar. 27, 2008

(30) Foreign Application Priority Data

Jul. 26, 2006 (JP) .............. 2006-202859
Jul. 26, 2006 (JP) .............. 2006-202860

(51) Int. Cl.
*H01G 4/06* (2006.01)
(52) U.S. Cl. .............. 361/303; 361/306.1; 361/311; 361/321.4; 29/25.03; 29/25.42
(58) Field of Classification Search .......... 29/830–831, 29/846, 25.01–25.03, 25.35–25.42; 438/393, 438/399, 250–251; 361/748, 303, 306.3, 361/301.4, 321.1–321.5; 257/302–310
See application file for complete search history.

(56) References Cited

U.S. PATENT DOCUMENTS

| 4,008,514 A * | 2/1977 | Elderbaum .............. 29/25.42 |
| 6,207,522 B1 * | 3/2001 | Hunt et al. .............. 438/393 |
| 6,728,092 B2 * | 4/2004 | Hunt et al. .............. 361/303 |
| 7,029,971 B2 * | 4/2006 | Borland et al. .............. 438/250 |
| 7,190,016 B2 * | 3/2007 | Cahalen et al. .............. 257/310 |
| 2008/0072409 A1 * | 3/2008 | Kato et al. .............. 29/25.42 |
| 2008/0186128 A1 * | 8/2008 | Chang et al. .............. 338/22 R |

FOREIGN PATENT DOCUMENTS

| JP | 2000-164460 A | 6/2000 |
| JP | 2001-210789 A | 8/2001 |
| JP | 2003-526880 A | 9/2003 |
| JP | 2004-296679 A | 10/2004 |
| JP | 2005-203680 A | 7/2005 |
| JP | 2005-252130 A | 9/2005 |
| JP | 2006-049510 A | 2/2006 |

* cited by examiner

*Primary Examiner*—Minh Trinh
(74) *Attorney, Agent, or Firm*—Oblon, Spivak, McClelland, Maier & Neustadt, L.L.P.

(57) ABSTRACT

One capacitor fabrication process including metal layer forming a metal layer on one surface of a substrate, dielectric layer forming a dielectric layer on the metal layer, metal foil forming a metal foil on the dielectric layer, separating the noble metal layer from the dielectric layer, and electrode layer forming an electrode layer on the second surface of the dielectric layer, wherein the second surface faces away from the first surface of the dielectric layer with the metal foil. Another capacitor fabrication process includes separation layer forming a separation layer on one surface of a substrate, dielectric layer forming a dielectric layer on the separation layer, metal foil forming a metal foil the dielectric layer, separating the substrate from the separation layer, and an electrode layer forming an electrode layer on the second surface of the dielectric layer, wherein the second surface faces away from the first surface of said dielectric layer with the metal foil. A thin-film capacitor has higher capacity, is so slimmed down and has a form well fit for being buried in a base board, and can be used even at high frequencies.

10 Claims, 2 Drawing Sheets

METHOD OF MANUFACTURING CAPACITOR

BACKGROUND OF THE INVENTION

1. Field of the Invention

The present invention relates to a process for the fabrication of a capacitor having a structure wherein a thin film layer of dielectric material and an electrode layer are stacked on a metal foil, and more particularly to a process for the fabrication of a capacitor that is slimmed down in its entirety in such a way as to be built in a board (interconnecting board) for electronic packages, etc., and that is to be buried in the board.

2. Explanation of the Prior Art

A thin-film capacitor comprising a thin-film dielectric layer and an electrode layer provided on a metal foil is known as a buried type capacitor that is well fit for being incorporated in a board. In that capacitor, the metal foil takes a role of supporting a capacitor formed thereon, and works as an electrode for the completed capacitor as well. For this reason, the thin-film capacitor comprising a thin-film dielectric layer and an electrode layer provided on that metal foil is simpler in structure, lower in fabrication cost, and smaller in overall thickness than a thin-film capacitor comprising an electrode layer, a thin-film dielectric layer and an electrode layer provided on an insulating substrate: it is best suited as a buried type capacitor for interconnecting boards.

The prior art, for instance, JP(A)2000-164460 discloses a thin-film capacitor comprising a dielectric material on a metal foil selected from copper, nickel and so on.

Further, JP(A)2003-526880 discloses that a dielectric thin film having a perovskite crystal structure such as lead zironate titanate has a higher dielectric constant, lower dielectric losses and more limited leak currents, and may be fabricated by techniques such as sol-gel processes or sputtering processes, forming a PZT thin film on a foil such as one formed of brass, platinum, titanium or stainless steel.

Furthermore, JP(A)2001-210789 discloses a process wherein, to form on a member of low heat resistance a capacitor equipped with a dielectric thin film having a perovskite crystal structure formed at high temperatures, a noble metal is formed on a high heat-resistant substrate such as a silicon substrate, then a capacitor structure is formed, then the capacitor structure is bonded onto a separately made member of low heat resistance, and finally the capacitor structure is separated off the high heat-resistant substrate such as the silicon substrate.

For the metal foil, however, its surface must be fully smoothened so as to prevent the capacitor from shorts, and this requirement is found to become one reason for high costs involved. Further, when a thin substrate is used to make the whole capacitor thin, there is much difficulty in handling it, which is found to become a leading reason for lower yields.

When a copper foil that is considered most preferable because of low electric resistance is used as the metal foil for burying purposes, it is found to be incapable of being fully sintered at high temperatures in an oxidizing atmosphere because copper is susceptible of oxidization and has a low melting point. This is also true even when use is made of the same composition material as a perovskite ceramics dielectric material that is a high dielectric constant material. It is still impossible to obtain a device of large enough capacity due to inadequate crystallization, or there is a problem with large leak currents. When use is made of a nickel foil that is relatively less susceptible of oxidization although its electric resistance is somewhat high, too, there is still a problem with oxidization of nickel or diffusion of nickel to the dielectric material at the step of firing a dielectric material in a high-temperature oxidizing atmosphere of 600° C. or higher; there is still difficulty in fabricating a high-capacity capacitor.

On the other hand, the outer surface (with no dielectric layer formed on it) of the metal foil for buried type capacitors must be coarsened to make sure contact strength for burying. As the dielectric layer is formed on the metal foil having a coarsened surface on one side, however, the influence of coarsening often passes onto the opposite surface, giving rise to the risk of making a short circuit in the device. After the formation of the dielectric layer, coarsening treatment may be carried out by etching, electroplating or electroless plating. However, this is found to bring about a high steps count and, in some cases, cause damage to the dielectric layer, again resulting in cost rises.

There is a transfer process for a previously prepared capacitor structure available, but it renders electrical connection of the capacitor structure to a capacitor electrode difficult. For the electrode provided prior to the formation of the dielectric layer, it is required to use costly materials such as platinum or gold for the purpose of heat resistance and oxidization resistance, and there is a soaring of costs for obtaining the thick electrode film of low electric resistance necessary as a capacitor well adapting to a high-frequency range.

In view of such situations, an object of the present invention is to provide a capacitor fabrication process capable of obtaining a thin-film capacitor at low costs and high yields that has a higher capacity and a form well suited as a buried type capacitor having a reduced overall thickness, and can be used even at high frequencies.

SUMMARY OF THE INVENTION

To accomplish that object, the first invention is embodied as follows. That is to say, the first capacity fabrication process of the invention comprises a noble metal layer formation step of forming a noble metal layer on one surface of a substrate, a dielectric layer formation step of forming a dielectric layer on said noble metal layer, a metal foil formation step of forming a metal foil of 10 μm or greater in thickness on said dielectric layer, a separation step of separating said noble metal layer from said dielectric layer at an interface, and an electrode layer formation step of forming an electrode layer on the second surface of said dielectric layer separated off by the separation step, wherein the second surface faces away from the first surface of said dielectric layer with said metal foil formed thereon.

In one preferable embodiment of the first invention, at said separation step, a one-piece assembly of said metal foil and said dielectric layer is separated off said noble metal layer formed on said substrate.

In another preferable embodiment of the first invention, said substrate is a silicon wafer having a thermally oxidized film, said noble metal layer is Pt, and the separating interface at said separation step is an interface between said noble metal layer comprising Pt and said dielectric layer.

In yet another preferable embodiment of the first invention, titanium oxide or tantalum oxide is interposed as a contact layer between said substrate and said noble metal layer.

In a further preferable embodiment of the first invention, the capacitor to be fabricated has a multilayer structure of said electrode layer, said dielectric layer and said metal foil.

In a further preferable embodiment of the first invention, said dielectric layer is perovskite ceramics.

In a further preferable embodiment of the first invention, said electrode layer and said metal foil are each made of Cu.

In a further preferable embodiment of the invention, at said dielectric formation step, the dielectric layer is fired, after which said metal foil formation step, said separation step and said electrode formation step are implemented in order.

As noted above, the first capacitor fabrication process of the invention comprises a noble metal layer formation step of forming a noble metal layer on one surface of a substrate, a dielectric layer formation step of forming a dielectric layer on said noble metal layer, a metal foil formation step of forming a metal foil of 10 μm or greater in thickness on said dielectric layer, a separation step of separating said noble metal layer from said dielectric layer at an interface, and an electrode layer formation step of forming an electrode layer on the second surface of said dielectric layer separated off by the separation step, wherein the second surface faces away from the first surface of said dielectric layer with said metal foil formed thereon. It is thus possible to obtain at low costs and high yields a thin-film capacitor that has a higher capacity and a form well suited as a buried type capacitor having a reduced overall thickness, and can be used even at high frequencies. This advantage is achieved because, unlike a conventional capacitor having a dielectric layer and an electrode layer formed on a metal foil wherein the dielectric layer is formed on the metal foil readied up at first, the dielectric layer is first formed on the noble metal layer and the metal foil (in film form) is then formed thereon.

To accomplish the aforesaid object, the second invention is embodied as follows. That is to say, the second capacitor fabrication process of the invention comprises a separation layer formation step of forming a separation layer on one surface of a substrate, a dielectric layer formation step of forming a dielectric layer on said separation layer, a metal foil formation step of forming a metal foil of 10 μm or more in thickness on said dielectric layer, a separation step of separating off said dielectric layer at an interface between said substrate and said separation layer, and an electrode layer formation step of forming an electrode layer on the second surface of said dielectric layer separated off by said separation step via said separation layer, wherein the second surface faces away from the first surface of said dielectric layer with said metal foil formed thereon.

In one preferable embodiment of the invention, at said separation step, a one-piece assembly of said metal foil, said dielectric layer and said separation layer is separated off said substrate at an interface between said separation layer and said substrate.

In another preferable embodiment of the invention, said substrate is a silicon wafer having a thermally oxidized film, said separation layer is Pt, and the separating interface at said separation step is an interface between the thermally oxidized film layer on the silicon wafer and the separating interface comprising Pt.

In yet another preferable embodiment of the invention, the capacitor to be fabricated has a multilayer structure of said electrode layer, said separation layer, said dielectric layer and said metal foil.

In a further preferable embodiment of the invention, said dielectric layer is perovskite ceramics.

In a further preferable embodiment of the invention, said electrode layer and said metal foil are each made of Cu.

In a further preferable embodiment of the invention, at said dielectric formation step, the dielectric layer is fired, after which said metal foil formation step, said separation step and said electrode formation step are implemented in order.

As noted above, the second capacitor fabrication process of the invention comprises a separation layer formation step of forming a separation layer on one surface of a substrate, a dielectric layer formation step of forming a dielectric layer on said separation layer, a metal foil formation step of forming a metal foil of 10 μm or more in thickness on said dielectric layer, a separation step of separating off said dielectric layer at an interface between said substrate and said separation layer, and an electrode layer formation step of forming an electrode layer on the second surface of said dielectric layer separated off by said separation step via said separation layer, wherein the second surface faces away from the first surface of said dielectric layer with said metal foil formed thereon. It is thus possible to obtain at low costs and high yields a thin-film capacitor that has a higher capacity and a form well suited as a buried type capacitor having a reduced overall thickness, and can be used even at high frequencies. This advantage is achieved because, unlike a conventional capacitor having a dielectric layer and an electrode layer formed on a metal foil wherein the dielectric layer is formed on the metal foil readied up at first, the dielectric layer is first formed on the noble metal layer and the metal foil (in film form) is then formed thereon.

DETAILED EXPLANATION OF THE INVENTION

The best mode for carrying out the invention is now explained in details.

First of all, the invention relating to the first capacitor fabrication process (the first invention) is explained with reference to FIGS. 1A through 1E.

Explanation of the First Invention

The capacitor fabrication process of the invention comprises (1) a noble metal layer formation step of forming a noble metal layer on one surface of a substrate, (2) a dielectric layer formation step of forming a dielectric layer on said noble metal layer, (3) a metal foil formation step of forming a metal foil on said dielectric layer, (4) a separation step of separating said noble metal layer from said dielectric layer at an interface, and (5) an electrode layer formation step of forming an electrode layer on the second surface of said dielectric layer separated off at said separation step, wherein the second surface faces away from the first surface of said dielectric layer with said metal foil formed thereon.

The respective steps are now explained in details with reference to FIGS. 1A to 1E illustrative in schematic and section of the steps with time of part of the capacitor fabrication process according to the invention.

There is a substrate preparatory step provided as the pre-step preparatory to the aforesaid respective steps, at which the substrate used for the capacitor fabrication process of the invention is readied up.

Substrate Preparatory Step

A substrate that has a smooth surface and shows heat resistance and oxidation resistance at a temperature higher than a dielectric material firing temperature is readied up for a substrate 10 used herein. Specifically, that substrate must be invariable in its surface nature even at a firing step of 600 to 1,000° C.

For such a substrate, it is preferable to use a silicon wafer of which the surface is thermally oxidized to have a thermally oxidized film, partly because it is available as a substrate having good surface smoothness at relatively low prices, and partly because it is relatively easy to obtain a suitable degree of contact strength between that substrate and the noble metal layer formed thereon, as will be described later.

Noble Metal Formation Step

Figure 1A:
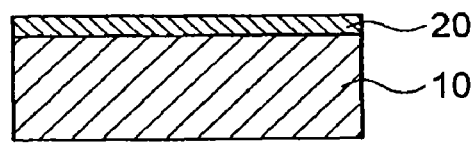
FIG. 1 is illustrative in schematic and section of steps with time of part of the first capacitor fabrication process according to the invention.

At the noble metal formation step, a noble metal layer 20 is formed on one surface of the substrate 10 at the ready, as shown in FIG. 1A.

The noble metal layer 20 has a suitable degree of contact strength to a dielectric layer 30 as described above; it behaves in such a way as to be in intimate contact with the substrate 10 until when the dielectric layer 30 and a metal foil 40 are formed on the noble metal layer 20 at the subsequent steps, as will be described later. Thereafter, for instance, as an appropriate external force is added to near the noble metal layer 20, it allows the noble metal 20 to be separated from the dielectric layer 30 at interfaces 30a, 20a.

Control of such contact strength may optionally be gained through the selection of the material for the noble metal layer 20, the selection of film-formation techniques, etc.

The phrase "separation of the noble metal layer from the dielectric layer at the interfaces" referred to herein is understood to mean two cases: one wherein the noble metal layer is thoroughly separated from the dielectric layer at the joining interfaces, and another wherein the noble metal layer is separated from the dielectric layer while they are partly broken up.

Specifically, the noble metal layer 20 should be made up of platinum, gold, rhodium, iridium or like materials, because they are less likely to be oxidized even at the firing step for the dielectric layer to be described later. Particular preference is given to platinum in view of hardness, melting point, etc.

The noble metal layer 20 in film form may be formed by sputtering, vapor deposition, ion plating or other known film-formation techniques. To obtain the suitable contact strength demanded herein, it is particularly preferable to rely on sputtering.

The noble metal layer 20 should have a thickness of about 10 to 100 nm. At less than 10 nm, it will be difficult to obtain a uniform film for that layer and peel off that layer. At greater than 100 nm, cost problems will arise.

It is noted that even for an ordinary thin-film capacitor, the noble metal layer 20 made up of platinum is widely used as an electrode; to enhance contact strength to the substrate 10, however, titanium oxide, tantalum oxide or the like is often used as a contact layer. In the invention, too, it is preferable to interpose a contact layer of titanium oxide, tantalum oxide or the like between the noble metal layer 20 and the substrate 10, thereby obtaining the contact strength of the noble metal layer 20 to the substrate 10.

That is to say, in the invention, conditions, etc. are set in such a way that the contact strength of substrate 10/noble metal layer 20 is greater than that of noble metal layer 20/dielectric layer 30. When the noble metal layer 20 is formed by sputtering, it is preferable to make the conditions for reverse sputtering tighter than usual.

How to enhance the contact strength of substrate 10/noble metal layer 20 is now specifically explained in greater details.

When the noble metal layer 20 is formed by a vacuum technique, the contact strength of substrate 10/noble metal layer 20 varies depending on (1) to what degree their surfaces are cleaned by reverse sputtering just prior to sputtering, (2) to what degree their surfaces are coarsened and an output (power) for film formation by sputtering, and (3) film formation temperature, or the like. That is to say, if reverse sputtering is not carried out or if it performed under less tight conditions, the contact strength becomes weak because moisture or the like adsorbed onto the surface of the substrate is not completely removed off. If reverse sputtering is carried out under tight conditions, on the contrary, the contact strength builds up due to the anchor effect resulting from the fact that the surface of the substrate 10 is sputtered and cleaned because of removal of adsorbed matters, and there are minute asperities occurring at the surface of the substrate 10.

The output of film formation by sputtering brings about a change in the acceleration energy of sputtering particles; as film formation takes place at a high output, it permits high energy particles to collide with the substrate 10 for film formation with the result that the contact strength builds up.

High film formation temperatures ensure that the surface of the substrate is cleaned due to removal of absorbed matters, and as particles (atoms) arrive at the surface of the substrate, they remain fixed to a more stable site, resulting in increased contact strength.

Dielectric Layer Formation Step

Figure 1B:
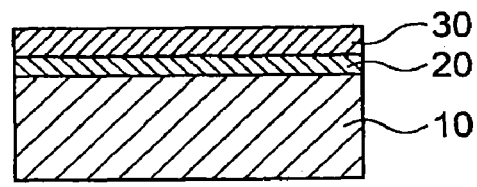

At the dielectric layer formation step, the dielectric layer 30 is formed on the noble metal layer 20, as shown in FIG. 1B.

For the dielectric material forming the dielectric layer 30, preference is given to oxides having a known perovskite crystal structure represented by general formula: $ABO_3$, for instance, barium titanate (BT), lead zironate titanate (PZT), lead lanthanum zircono-titanate (PLZT), lead magnesium niobate (PMN), and barium strontium titanate (BST), although barium titanate (BT) or barium strontium titanate (BST) is most preferred, because they are friendly to the lead-free environment, and can achieve a high dielectric constant.

Such dielectric layer 30 may be formed by techniques such as the so-called CVD processes, sol-gel processes, MOD processes (organic metal decomposition processes), and sputtering processes. Preference is given to the sol-gel, and MOD processes, because they can be carried out without using any vacuum apparatus and at low costs, and there is appropriate contact strength obtained, which makes sure easy separation.

The dielectric layer 30 here should preferably have a thickness of 0.1 to 1 μm. Within this range, there would be no inconvenience such as possible short circuits, and the dielectric layer 30 could be kept against cracks from stress occurring in burying it in the base substrate simultaneously with the achievement of large enough capacitor capacity. The dielectric material for the dielectric layer 30 here should preferably be fired at a temperature of 600 to 1000° C. Within such a firing temperature range, the capacity of the capacitor could be ensured with no or little deterioration of leak properties and dielectric losses; well-balanced properties could be obtained.

The dielectric layer here does not have such high dielectric constants as found in perovskite ceramics, specifically a capacity density of greater than 1 μF/cm² just after formed, i.e., just after the dielectric layer formation step in the restricted sense, because it still remains in a precursor state with inadequate crystallization or containing organic matters. The term "dielectric layer formation step" in the present disclosure is understood to refer to the whole of a high dielectric constant layer formation process that includes, in addition to the dielectric layer formation step in the strict sense, a later firing step at which the dielectric layer is fired at 600 to 1,000° C. into a high dielectric constant material layer. In other words, the term "perovskite ceramics dielectric material" is understood to refer to a high dielectric constant material that has been fired at 600 to 1,000° C. after the dielectric layer formation step. Firing should preferably be carried out in the atmosphere or in an oxygen atmosphere such as pure oxygen, although a dielectric layer containing plenty of oxygen prior to firing may be fired in a vacuum or nitrogen.

Metal Foil Formation Step

Figure 1C:
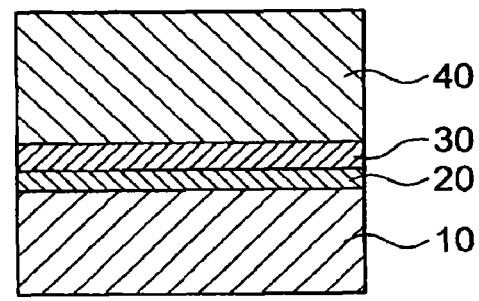

At the metal foil formation step, a metal foil 40 is then formed on the dielectric layer 30, as shown in FIG. 1C.

In the invention, the metal foil 40 formed on the dielectric layer 30 does not only function as an electro-conductive electrode but also has a substrate function, i.e., a function of holding the structure. The metal foil 40 here is understood to refer to a two-dimensional metal structure sheet having a thickness of 10 μm or more. A preferable thickness is in the range of 12 to 50 μm Note here that the metal foil 40, when having a thickness of less than 10 μm, cannot peel off. In other words, the separation step of the invention fails to have the function that it should have. Although the reason for this has yet to be clarified, there may possibly be the stress of the metal foil involved. In addition, the metal foil 40 will no longer function as the substrate for holding the structure, rendering the handling of the structure (capacitor) during or after the production process difficult. When the thickness of the metal foil 40 exceeds 50 μm, on the other hand, it is prima facie possible to achieve the advantages of the invention; however, that is not preferable because the whole capacitor grows too thick to be buried in the board, and costs much as well. It is noted that a mere electrode layer formed on the dielectric layer, because of having no substrate function, i.e., no function of holding the structure, does not come within the purview of the "metal foil" referred to herein.

Such metal foil 40 here may be formed by a variety of known processes. The metal foil 40, especially because of being formed on the dielectric layer 30 that is not an electro-conductive member, may be formed by known processes such as electroless plating or sputtering at least at an initial stage; in view of productivity improvements, however, particular preference is given to an electroplating process wherein an underlay electro-conductive film is formed by sputtering or electroless plating, and thereafter configured into an electrode.

It is also preferable that electroplating is carried out early on a small current and then on an increasing current. This is because as a large current is applied in the initial stage, i.e., in the stage where there is only the underlay electroconductive film having high sheet resistance, the metal foil 40 will often peel off at an interface of feeble contact strength.

In a preferable embodiment of the invention, the thickness of the underlay electroconductive film should be greater than usually employed 0.1 to 0.3 μm. To be specific, a copper or nickel underlay film should have a thickness of preferably at least 0.5 μm, and more preferably 1 to 5 μm, because of prevention of damage due to defoliation in an early stage of electroplating. When the underlay electroconductive film is formed by electroless plating, the electroless plating is carried out after the formation of a known palladium/tin catalyst layer or silver catalyst layer.

When the metal foil 40 is formed by electroplating, coarsening may be achieved by making the current value in the final stage of electroplating higher than the critical current density. The "critical current density" here is understood to refer to a current density at which the diffusion of metal ions takes place at a rate-determining step. As electroplating takes place at greater than that current density, it will cause the plated surface to be coarsened under the influences of generated hydrogen, etc. For instance, a current density at which there is a glossy surface obtainable in a copper sulfate plating bath is about 0.5 to 5 A/dm$^2$, the critical current density is 6 to 10 A/dm$^2$. In other words, if a film is formed at a current density higher than that, it is then possible to obtain a metal foil having a desired coarsened surface.

Separation Step

Figure 1D:
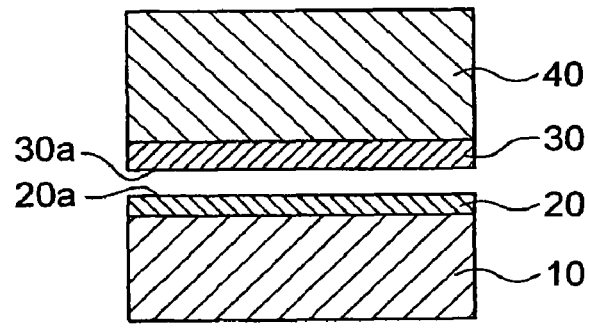

Then, as shown in FIG. 1D, at the separation step, the noble metal layer 20 and the dielectric layer 30 are separated off at the interfaces 20a and 30a: at this separation step, a one-piece assembly comprising (substrate 10/noble metal layer 20) and a one-piece structure (dielectric layer 30/metal foil 40) provided on it are separated into two.

In the invention, the contact strength of noble metal layer 20/dielectric layer 30 is smaller than that of substrate 10/noble metal layer 20 or that of dielectric layer 30/metal foil 40 so that such separation as shown in FIG. 1D can take place. For instance, the noble metal layer 20 can be separated off the dielectric layer 30 merely by thrusting a knife edge into their interfaces. The contact strength of noble metal layer 20/dielectric layer 30 grows relatively strong with a distance from their center; in other words, if the outer periphery of the one-piece is first separated off, the whole is then easily separated off. Of course, use may also be made of known separation techniques such as the application of force from outside, and the application of thermal shocks utilizing a thermal expansion coefficient difference. If only the metal foil on the outer periphery of the one-piece structure having relatively strong contact strength is etched or otherwise removed off, the separation step may be implemented substantially with no or little application of external force. This is preferable in view of yield improvements, because damage to the dielectric layer is minimized.

The separated one-piece assembly (of substrate 10/noble metal layer 20) is recyclable; the costly silicon substrate and noble metal are usable as often as necessary, making a lot more contribution to cost reductions. For recycling, it is also preferable to make the surface of the noble metal layer smoother by CMP (chemical-mechanical polishing).

Electrode Layer Formation Step

Figure 1E:
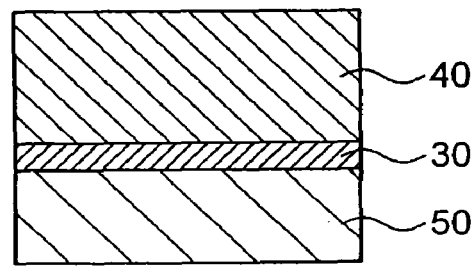

Then, at the electrode layer formation step, an electrode layer 50 is formed on the dielectric layer 30 in the one-piece structure (a multilayer structure of dielectric layer 30/metal foil 40) separated off at the separation step, as shown in FIG. 1E. More specifically, the electrode layer 50 is formed on the second surface of the dielectric layer 30 facing away from the first surface with the metal foil 40 formed on it.

Obtaining high-frequency properties requires lower resistance; in the invention, it is preferable that inexpensive yet high electroconductive copper or nickel, especially copper is formed by sputtering as an underlay film, and a copper layer is then formed by electroplating. The electrode layer 50 should have a thickness of preferably 5 to 100 μm. At a thickness of less than 5 μm, it will be difficult to obtain adequate high-frequency properties, and at a thickness of greater than 100 μm, there will be much difficulty in using the capacitor as a buried type capacitor. The formation of the electrode layer 50 having much the same thickness as that of the metal foil 40 makes double-side co-processing easy by etching.

Incidental Steps, etc.

In the invention, if all or a main part of the metal foil 40 or the electrode layer 50 is made up of Cu, both may then be co-patterned without doing damage to the dielectric layer. That is to say, both masked in the desired patterns are etched with an ammonium persulfate solution so that both surfaces of the metal foil 40, and the electrode 50 are co-patterned. Unlike nickel or iron etchants (for instance, sulfuric acid, iron chloride solution or the like), etc., the ammonium persulfate solution is unlikely to do damage to the dielectric layer 30. Thus, because both surfaces of the metal foil 40, and the electrode layer 50 can be co-processed, patterning can be implemented at low costs. It is here noted that for co-etching of both surfaces, the metal foil 40 and the electrode layer 50 should have preferably much the same thickness.

Upon patterning by etching, the dielectric layer functions as an etching stop layer. For a more reliable etching stop layer, it is acceptable to form on the dielectric layer an electroconductive layer that is etched at a by far lower etching rate than be possible with copper, or not etched at all, for instance, a nickel or platinum layer. However, that layer should have a thickness of 1 μm or less, and preferably 0.3 μm or less, because it is higher in electric resistance than copper. Such a thin etching stop layer would have a much slender influence on capacitor properties. In other words, it is preferable in the invention that the metal foil and the electrode layer are each made of copper in general and a copper film obtained by electroplating in particular. However, it is not always necessary that it is all made of copper; a part of it may be replaced by other metal.

It is noted that although the capacitor of the invention is used while buried integrally in a board, yet it can be handled by itself; it may be fabricated and sold as an intermediate product. More specifically, the capacitor fabricated by the capacitor fabrication process of the invention is a capacitor buried in a board comprising a dielectric layer having a first surface and a second surface parallel with the first surface and made of a perovskite oxide ceramics dielectric material fired at 600 to 1,000° C. wherein there is an at least 10-μm thick metal foil formed on the first surface and there is an electrode layer formed on the second surface. It is then preferable that the metal foil is made of copper formed in film form by electroplating, and the electrode layer having a thickness of 5 μm or greater is made of copper in film form by electroplating.

The capacitor fabricated by the capacitor fabrication process of the invention may be used while buried in an electronic package board on which electronic parts such as IC chips are to be mounted. And, it is possible to bury the capacitor in the board at steps similar to those of the fabrication process of interconnecting boards using ordinary copper foils.

That is to say, the capacitor fabricated by the capacitor fabrication process of the invention provides a capacitor-incorporated electronic package capable of effectively reducing the reactance portion of loop inductance, because it can be located just below an IC chip and built in a package board.

EXAMPLES

The present invention is now explained in greater details with reference to specific examples of the invention (the first invention) concerning the first capacitor fabrication process. See FIGS. 1A through 1E.

Example 1-1

A silicon wafer (of 6 inches in diameter) having a thermally oxidized film was used as the substrate 10.

First, a TiOx (titanium oxide) layer of thickness 5 nm was formed by sputtering as a contact layer, and then pre-annealed at 900° C. for 1 hour in the atmosphere. On that contact layer, a Pt (platinum) layer of thickness 50 nm was formed as the noble metal layer 20, which was again pre-annealed at 900° C. for a further 1 hour in the atmosphere.

A precursor solution (composed of BaO and $TiO_3$) containing octylates of Ba and Ti as metal oxide precursors was coated on the aforesaid noble metal layer 20 by spin coating at 3,000 rpm for 20 seconds.

After coating, the coating was dried by a 10-minute heating at 150° C. on a hot plate in the atmosphere to form a precursor layer.

Then, the precursor layer was heated at 400° C. for 10 minutes on a hot plate in the atmosphere (calcining). Similar coating, drying and calcining were repeated until the precursor layer had a given thickness.

After calcining, the precursor layer was heated (fired) at 800° C. for 30 minutes in an infrared fast heating furnace placed in a vacuum atmosphere reduced down to 0.05 Pa to form the dielectric layer 30. The obtained dielectric layer 30 was found to have a thickness of 300 nm as measured with an optical thickness gauge.

Then, a Cu layer of thickness 1 μm was formed by sputtering on the dielectric layer 30, after which a copper metal foil of thickness 17 μm was formed thereon by electroplating in a copper sulfate bath with the sputtered Cu layer as a cathode (the formation of the metal foil 40).

It is here noted that in one minute from before 6 minutes to before 5 minutes prior to completion of the latter half of electroplating, electroplating was carried out at 8 $A/dm^2$ twice as high as the critical current density of 4 $A/dm^2$ to obtain an electrolytic foil having a coarsened surface. The surface roughness was found to be Ra=1.5 μm.

Then, as there was an indentation cut near the interface between the Pt noble metal layer 20 and the dielectric layer 30 by means of a knife edge, a one-piece structure (hereinafter simply called the BT/Cu metal foil) comprising a multilayer structure of dielectric layer 30/Cu metal foil 40 was separated off the silicon substrate 10 having a thermally oxidized film, on which the Pt noble metal layer 20 was provided. After separation, the "BT/Cu metal foil" could be handled of its own. The Cu metal foil was found to function well as a support.

Then, a Cu layer of thickness 1 μm was formed by sputtering on the BT side of the "BT/Cu metal foil", after which a copper electrode layer of thickness 16 μm was formed thereon by electro-plating with the sputtered Cu layer as a cathode (the formation of electrode layer 50).

Then, photoresists were pasted on both surfaces of the assembly, and the respective patterns of both surfaces were exposed to light through metal masks. After development, an ammonium persulfate solution was used to dissolve off unnecessary copper (partly unnecessary portions of the Cu metal layer 40 and Cu electrode layer 50).

In this way, there was a thin-film capacitor of about 35 μm in total thickness fabricated, wherein the electrodes on both sides were made of Cu with BT—perovskite ceramics—as the dielectric layer.

The total thickness of this thin-film capacitor was much the same as the standard thickness of a printed circuit board copper foil, and by using that thin-film capacitor in place of an ordinary interconnecting copper foil, it could be buried as a decoupling capacitor in an IC package board. The IC package with that decoupling capacitor built in it was much more improved in terms of high-frequency decoupling function over a conventional package with a chip capacitor outside.

There was none of damage to the dielectric layer by reason of copper etching, with yields of 95% or greater. The fabrication cost involved only expenses taken for the formation of dielectric layer 30, copper sputtering (a part of copper metal foil 40 and a part of electrode layer 50), copper plating (a part of copper metal foil 40 and a part of electrode layer 50) and patterning, remaining low.

The capacity of the device per unit area was 3.5 µF/cm², and the impedance at 1 GHz, too, was Z=0.1Ω, figures indicative of satisfactory properties for capacitors buried in boards.

Example 1-2

In Example 1-1, the TiOx (titanium oxide) contact layer of thickness 5 nm was not used, but instead contact enhancement was carried out before the sputtering of Pt noble metal layer 20. That is, before the sputtering of Pt noble metal layer 20, a 5-minute reverse sputtering was carried out at an output of 400 W in an argon atmosphere in the same vacuum chamber for the surface treatment of the substrate. Immediately thereafter the Pt noble metal layer 20 was formed at an output of 400 W.

Experimentation for Example 1-2 was done under otherwise the same conditions. As a result, it was found that much the same satisfactory effects as in Example 1-1 were achieved.

Example 1-3

This example was almost the same as Example 1-1 with the exception that after the formation of a Ni layer of thickness 1 µm on the dielectric layer 30 by means of sputtering, a metal copper foil of thickness 26 µm was provided by electroplating with that sputtered Ni layer as a cathode, and after separation, a Ni layer of thickness 7 µm was formed by sputtering on the BT side of the "BT/Cu metal foil", after which a copper electrode of thickness 7 µm was provided by means of electroplating with that sputtered Ni layer as a cathode.

After patterning by copper etching, the underlay Ni layer was removed off by ion milling. As a result, yields of 99% or higher were achieved. It was also found that other properties were satisfactory as in Example 1-1.

From the results of the aforesaid experiments, the advantages of the first invention would be undisputed.

That is to say, according to the capacitor fabrication process of the invention comprising a noble metal layer formation step of forming a noble metal layer on one surface of a substrate, a dielectric layer formation step of forming a dielectric layer on said noble metal layer, a metal foil formation step of forming a metal foil of at least 10 µm in thickness on said dielectric layer, a separation step of separating said noble metal layer from said dielectric layer at an interface, and an electrode layer formation step of forming an electrode layer on the second surface of said dielectric layer separated off by said separation step, wherein said second surface faces away from the first surface of said dielectric layer with said metal foil formed thereon, it is possible to obtain at low costs and high yields a thin-film capacitor that has a higher capacity and a form well suited as a buried type capacitor having a reduced overall thickness, and can be used even at high frequencies. This advantage is achieved because, unlike a conventional capacitor having a dielectric layer and an electrode layer formed on a metal foil wherein the dielectric layer is formed on the metal foil readied up at first, the dielectric layer is first formed on the noble metal layer and the metal foil (in film form) is then formed thereon.

Next, the second capacitor fabrication process of the invention (the second invention) is explained with reference to FIGS. 2A through 2E.

Explanation of the Second Invention

The second capacitor fabrication process of the invention comprises (1) a separation layer formation step of forming a separation layer on one surface of a substrate, (2) a dielectric layer formation step of forming a dielectric layer on said separation layer, (3) a metal foil formation step of forming a metal foil on said dielectric layer, (4) a separation step of separating said substrate from said separation layer at an interface, and (5) an electrode layer formation step of forming an electrode layer on the second surface of said dielectric layer separated off by said separation step, wherein said second surface faces away from the first surface of said dielectric layer with said metal foil formed thereon.

The respective steps are now explained in details with reference to FIGS. 2A to 2E illustrative in schematic and section of the steps with time of part of the second capacitor fabrication process according to the invention.

There is a substrate preparatory step provided as the pre-step preparatory to the aforesaid respective steps, at which the substrate used for the capacitor fabrication process of the invention is readied up.

Substrate Preparatory Step

A substrate that has a smooth surface and shows heat resistance and oxidation resistance at a temperature higher than a dielectric material firing temperature is readied up for a substrate 10 used herein. Specifically, that substrate must be invariable in its surface nature even at a firing step of 600 to 1,000° C. For such substrate 10, it is preferable to use a silicon wafer of which the surface is thermally oxidized to have a thermally oxidized film, partly because it is available as a substrate having good surface smoothness at relatively low prices, and partly because it is relatively easy to obtain a suitable degree of contact strength between that substrate and the separation layer formed thereon, as will be described later.

Separation Layer Formation Step

Figure 2A:
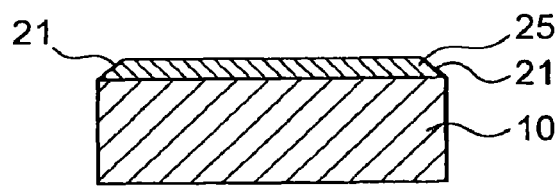
FIG. 2 is illustrative in schematic and section of steps with time of part of the second capacitor fabrication process according to the invention.

As shown in FIG. 2(A), at the separation layer formation step a separation layer 25 is formed on one surface of the substrate 10 at the ready.

The separation layer 25 has a suitable degree of contact strength to the substrate 10 readied up as described above; it behaves in such a way as to be in intimate contact with the substrate 10 until when a dielectric layer 30 and a metal foil 40 are formed on the separation layer 25 at the subsequent steps, as will be described later. Thereafter, for instance, as an appropriate external force is added to near the separation layer 25, it allows the separation layer 25 to be separated from the dielectric layer 10 at interfaces 10a, 25a. Control of such contact strength may optionally be gained through the selection of the material for the separation layer 25, the selection of film-formation techniques, etc.

The phrase "separation of the separation layer from the substrate at the interfaces" referred to herein is understood to mean two cases: one wherein the separation layer is thoroughly separated from the substrate at the joining interfaces, and another wherein the separation layer is separated from the substrate while they are partly broken up.

Such separation layer 26 should preferably be formed of a material having electroconductivity such that after the substrate 10 is separated from the separation layer 25 as described later, an electrode layer 50 can be formed directly on the opposite surface of that separation layer 25. That material should further have a function of preventing reactions with the dielectric material.

The contact strength between the substrate 10 and the separation layer 25 is first selected with their materials in mind. In general, there is increased contact strength occurring between oxides or between metals, and so a combination of oxide/metal is preferable. For instance, when the substrate 10 is formed of oxide silicon, the material for the separation layer 25 is selected from metals less likely to react with oxides, especially noble metals less susceptible of oxidization even at the dielectric firing step. There is the specific mention of platinum, gold, rhodium, iridium or like materials, and particular preference is given to platinum in view of hardness, melting point, etc.

Such separation layer 25 in film form may be formed by sputtering, vapor deposition, ion plating or other known film-formation techniques. To obtain the suitable contact strength demanded herein, it is particularly preferable to rely on sputtering.

The separation layer 25 should have a thickness of about 10 to 100 nm. At less than 10 nm, it will be difficult to obtain a uniform film for that layer and peel off that layer. At greater than 100 nm, cost problems will arise.

It is noted that in an ordinary thin-film capacitor, too, platinum is widely used as an electrode; to enhance contact strength to the substrate 10, however, titanium oxide, tantalum oxide or the like is used as a contact layer. In the invention, however, there is none of a titanium oxide, tantalum oxide or other contact layer used so as to obtain moderate strength to the substrate 10 and make sure electroconductivity.

Further, for more facilitated separation, it is desired that there is a slant 21 provided at each end of the separation layer 25, which becomes gradually thin toward the outermost. This takes advantage of the fact that the thinner the film, the more unlikely the separation is to occur due to the internal stress of the film. Thus, the invention makes intentional use of the slant 21 comprising an area that changes smoothly from zero at the outermost portion to a given film thickness.

Specifically, when the separation layer is formed by sputtering or the like, a metal mask is used to form an area around the metal mask, which is free of any separation layer. Further, by use of an invert tapered metal mask, a slant area (inclining surface) having a preferable thickness may be formed.

Dielectric Layer Formation Step

Figure 2B:
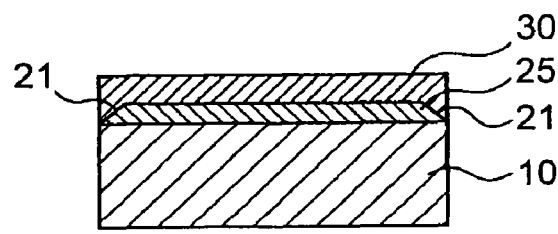

Then, at the dielectric layer formation step, the dielectric layer 30 is formed on the separation layer 25, as shown in FIG. 2B.

This dielectric layer formation step is basically much the same as in the aforesaid first invention.

That is to say, for the dielectric material forming the dielectric layer 30, preference is given to oxides having a known perovskite crystal structure represented by general formula: $ABO_3$, for instance, barium titanate (BT), lead zironate titanate (PZT), lead lanthanum zircono-titanate (PLZT), lead magnesium niobate (PMN), and barium strontium titanate (BST), although barium titanate (BT) or barium strontium titanate (BST) is most preferred, because they are friendly to the lead-free environment, and can achieve a high dielectric constant.

Such dielectric layer 30 may be formed by techniques such as the so-called CVD processes, sol-gel processes, MOD processes (organic metal decomposition processes), and sputtering processes.

The dielectric layer 30 here should preferably have a thickness of 0.1 to 1 μm. Within this range, there would be no inconvenience such as possible short circuits, and the dielectric layer 30 could be kept against cracks from stress occurring in burying it in the base board simultaneously with the achievement of large enough capacitor capacity. The dielectric material for the dielectric layer 30 here should preferably be fired at a temperature of 600 to 1,000° C. Within such a firing temperature range, the capacity of the capacitor could be ensured with no or little deterioration of leak properties and dielectric losses; well-balanced properties could be obtained.

The dielectric layer here does not have such high dielectric constants as found in perovskite ceramics, specifically a capacity density of greater than 1 $\mu F/cm^2$ just after formed, i.e., just after the dielectric layer formation step in the restricted sense, because it still remains in a precursor state with inadequate crystallization or containing organic matters. The term "dielectric layer formation step" in the present disclosure is understood to refer to the whole of a high dielectric constant layer formation process that includes, in addition to the dielectric layer formation step in the strict sense, a later firing step at which the dielectric layer is fired at 600 to 1,000% into a high dielectric constant material layer. In other words, the term "perovskite ceramics dielectric material" is understood to refer to a high dielectric constant material that has been fired at 600 to 1,000% after the dielectric layer formation step.

Firing should preferably be carried out in the atmosphere or in an oxygen atmosphere such as pure oxygen, although a dielectric layer in the precursor state containing oxygen may be fired in a vacuum or nitrogen.

Metal Foil Formation Step

Figure 2C:
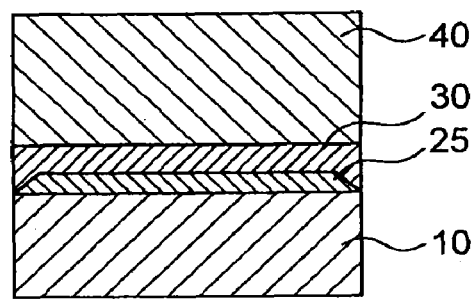

Then, at the metal foil formation step the metal foil 40 is formed on the dielectric layer 30, as shown in FIG. 2C.

This metal foil formation step is basically much the same as in the aforesaid first invention.

That is to say, in the invention, the metal foil 40 formed on the dielectric layer 30 does not only function as an electroconductive electrode but also has a substrate function, i.e., a function of holding the structure. The metal foil 40 here is understood to refer to a two-dimensional metal structure sheet having a thickness of 10 μm or more. A preferable thickness is in the range of 12 to 50 μm. Note here that the metal foil 40, when having a thickness of less than 10 μm, cannot peel off. In other words, the separation step of the invention fails to have the function that it should have. Although the reason for this has yet to be clarified, there may possibly be the stress of the metal foil involved. In addition, the metal foil 40 will no longer function as the substrate for holding the structure, rendering the handling of the structure (capacitor) during or after the production process difficult. When the thickness of the metal foil 40 exceeds 50 μm, on the other hand, it is prima facie possible to achieve the advantages of the invention; however, that is not preferable because the whole capacitor grows too thick to be buried in the board, and becomes costly as well. It is noted that a mere electrode layer formed on the dielectric layer, because of having no substrate function, i.e., no function of holding the structure, does not come within the purview of the "metal foil" referred to herein.

Such metal foil 40 here may be formed by a variety of known processes. The metal foil 40, especially because of being formed on the dielectric layer 30 that is not an electroconductive member, may be formed by known processes such as electroless plating or sputtering at least in an initial stage; in view of productivity improvements, however, particular preference is given to an electroplating process wherein an underlay electro-conductive film is formed by sputtering or electroless plating, and thereafter formed into an electrode.

It is also preferable that electroplating is carried out early on a small current and then on an increasing current. This is because as a large current is applied in the initial stage, i.e., in the stage where there is only the underlay electroconductive film having high sheet resistance, the metal foil 40 will often peel off at an interface of feeble contact strength.

In a preferable embodiment of the invention, the thickness of the underlay electroconductive film should be greater than usually employed 0.1 to 0.3 µm. To be specific, a copper or nickel underlay film should have a thickness of preferably at least 0.5 µm, and more preferably 1 to 5 µm, because of prevention of damage due to defoliation in an early stage of electroplating. When the underlay electroconductive film is formed by electroless plating, the electroless plating is carried out after the formation of a known palladium/tin catalyst layer or silver catalyst layer.

When the metal foil 40 is formed by electroplating, surface coarsening may be achieved by making the current value in the final stage of electroplating higher than the critical current density. The "critical current density" here is understood to refer to a current density at which the diffusion of metal ions takes place at a rate-determining step. As electroplating takes place at greater than that current density, it will cause the plated surface to be coarsened under the influences of generated hydrogen, etc. For instance, when the current density at which there is a glossy surface obtainable in a copper sulfate plating bath is about 0.5 to 5 $A/dm^2$, the critical current density is 6 to 10 $A/dm^2$. In other words, if a film is formed at a current density higher than that, it is then possible to obtain a metal foil having a desired coarsened surface.

Separation Step

Then, at the separation step, the substrate 10 and the separation layer 25 are separated off at the interfaces 10a and 25a: at this separation step, the substrate 10 and one-piece structure (separation layer 25/dielectric layer 30/metal foil 40) provided on it are separated into two. For instance, such separation operation as shown in FIG. 2D is implemented.

In the invention, the contact strength of substrate 10/separation layer 25 is smaller than that of separation layer 25/dielectric layer 30 or that of dielectric layer 30/metal foil 40 so that such separation as described above can take place. For instance, the substrate 10 and one-piece structure (separation layer 25/dielectric layer 30/metal foil 40) provided on it can be easily separated off merely by thrusting a knife edge from the state of FIG. 2C into their interfaces. The contact strength of substrate 10/separation layer 25 grows relatively strong with a distance from their center; in other words, if the outer periphery of the one-piece structure is first separated off, the whole is then easily separated off. Of course, use may also be made of known separation techniques such as the application of force from outside, and the application of thermal shocks utilizing a thermal expansion coefficient difference.

It is also preferable that only the outermost metal foil 40 of the one-piece structure having relatively strong contact strength is etched or otherwise removed off, because the separation step may be implemented substantially without the application of external force. In this case, the separation layer 25/dielectric layer 30, because of being thin, is usually cut along the outer contour line of the metal foil 40 (the state of FIG. 2D). In view of yield improvements, this method is preferable because of the least damage to the dielectric layer. Note here that much of material that is not etched or removed off and left behind at the outer peripheries of the separation layer 25 and dielectric layer 30 remains on the substrate 10, some depositing to the metal foil 40 (remnants or deposits are not shown).

Figure 2D:
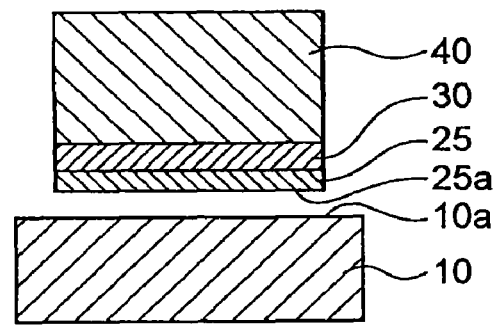

It is also to be understood that with the aforesaid method, it is acceptable to co-etch off the outermost metal foil 40 as well as the innermost separation layer 25 and dielectric layer 30, thereby facilitating the creation of the state of FIG. 2D.

The separated substrate 10 is recyclable; the costly silicon substrates 10 is usable as often as necessary, making a lot more contribution to cost reductions. For recycling, it is also preferable to make the surface of the silicon oxide film smoother by CMP (chemical-mechanical polishing). When the silicon oxide film gets thin after repeated recycling and CMC, the oxide film may be again thermally treated to gain thickness.

Electrode Layer Formation Step

Figure 2E:
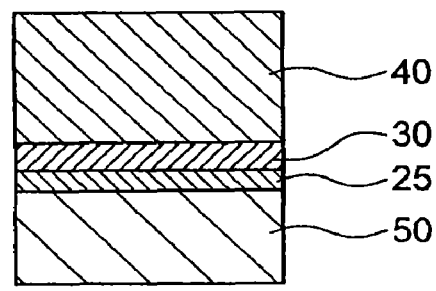

Then, at the electrode layer formation step, an electrode layer 50 is formed on the separation layer 25 in the one-piece structure (a multilayer structure of separation layer 25/dielectric layer 30/metal foil 40) separated off at the separation step, as shown in FIG. 2E. More specifically, the electrode layer 50 is formed via the separation layer 25 on the second surface of the dielectric layer 30 facing away from the first surface with the metal foil 40 formed on it.

In the invention, the separation layer 25 has electroconductivity by itself, and so it may have some thickness beforehand for direct use as the electrode layer. However, making sure good enough high-frequency properties requires low electric resistance; the separation layer must have some considerable thickness. Yet, as far as cost reductions are concerned, the formation of a thicker layer is not very practical because of costing much. In the invention, it is therefore preferable that the separation layer 25 is formed in such a small thickness as to make sure separation and on it there is the electrode layer 50 formed by electroplating using copper that is much less costly yet has high electroconductivity. The electrode layer 50 should have a thickness of preferably 5 to 100 µm. At a thickness of less than 5 µm, it will be difficult to obtain good enough high-frequency properties, and at a thickness of greater than 100 µm, there will be much difficulty in handling the capacitor as a buried type one.

Incidental Steps, etc.

In the invention, if all or a main part of the metal foil 40 or the electrode layer 50 is made up of Cu, both may then be co-patterned without doing damage to the dielectric layer. That is to say, both masked in the desired patterns are etched with an ammonium persulfate solution so that both surfaces of the metal foil 40, and the electrode 50 are co-patterned. Unlike nickel or iron etchants (for instance, sulfuric acid, iron chloride solution or the like), etc., the ammonium persulfate solution is unlikely to do damage to the dielectric layer 30. Thus, because both surfaces of the metal foil 40, and the electrode layer 50 can be co-processed, patterning can be implemented at low costs. It is here noted that for co-etching of both surfaces, the metal foil 40 and the electrode layer 50 have preferably much the same thickness.

Upon patterning by etching, the dielectric layer and the separation layer function together as an etching stop layer. For a more reliable etching stop layer, it is acceptable to form on the dielectric layer an electro-conductive layer that is etched at by far lower etching rates than be possible with copper, or not etched at all, for instance, a nickel or platinum layer. However, that layer should have a thickness of 1 µm or less, and preferably 0.3 µm or less, because it is higher in electric resistance than copper. Such a thin etching stop layer would have an extremely slender influence on capacitor properties. In other words, it is preferable in the invention that the metal foil and the electrode layer are each made of copper in general and a copper film obtained by electroplating in particular. However, it is not always necessary that it is all made of copper; a part of it may be replaced by other metal.

It is noted that although the capacitor of the invention is used while buried integrally in a board, yet it can be handled by itself; it may be fabricated and sold as an intermediate product. More specifically, the capacitor fabricated by the capacitor fabrication process of the invention is a buried type capacitor comprising a dielectric layer having a first surface and a second surface parallel with the first surface and made of a perovskite oxide ceramics dielectric material fired at 600 to 1,000° C. wherein there is an at least 10-μm thick metal foil formed on the first surface and there is an electrode layer formed on the second surface. It is then preferable that the metal foil is made of copper formed in film form by electroplating, and the electrode layer having a thickness of 5 μm or greater is made of copper in film form by electroplating.

The capacitor fabricated by the capacitor fabrication process of the invention may be used while buried in an electronic package board on which electronic parts such as IC chips are to be mounted. And, it is possible to bury the capacitor in the board at steps similar to those of the fabrication process of interconnecting boards using ordinary copper foils. That is to say, the capacitor fabricated by the capacitor fabrication process of the invention provides a capacitor-incorporated electronic package capable of effectively reducing the reactance portion of loop inductance, because it can be located just below an IC chip and built in the package board.

Examples

The present invention is now explained in greater details with reference to specific examples of the invention (the second invention) concerning the second capacitor fabrication process. See FIGS. 2A through 2E.

Example 2-1

A silicon wafer (of 6 inches in diameter) having a thermally oxidized film layer was used as the substrate 10.

First, a Pt (platinum) layer of thickness 50 nm was formed by sputtering as the separation layer 25. Here a 45-degree inverted taper metal mask of 2 mm in thickness was used such that there was none of Pt formed on the outermost periphery of the wafer, and in a range of about 2 mm, the peripheral area of a Pt pattern site varied from 0 to 50 nm in thickness (the formation of the slant 21). After the formation of the Pt film, it was pre-annealed at 900% for 1 hour in the atmosphere.

A precursor solution (composed of $BaO_{0.7}SrO_{0.3}TiO_3$) containing octylates of Ba, Sr and Ti as metal oxide precursors was coated on the aforesaid separation layer 25 by spin coating at 3,000 rpm for 20 seconds.

After coating, the coating was dried by a 10-minute heating at 150° C. on a hot plate in the atmosphere to form a precursor layer.

Then, the precursor layer was heated at 400° C. for 10 minutes on a hot plate in the atmosphere (calcining). Similar coating, drying and calcining were repeated until the precursor layer had a given thickness.

After calcining, the precursor layer was heated (fired) at 850° C. for 30 minutes in an infrared fast heating furnace placed in the atmosphere (having an oxygen content of 18%) to form the dielectric layer 30. The obtained dielectric layer 30 was found to have a thickness of 330 nm as measured with an optical thickness gauge.

Then, a Cu layer of thickness 2 μm was formed by sputtering on the dielectric layer 30, after which a copper metal foil of thickness 16 μm was formed thereon by electroplating in a copper sulfate bath with the sputtered Cu layer as a cathode (the formation of the metal foil 40).

Then, a masking tape was used to etch off only a 3-mm outer peripheral area of the metal foil 40 using an ammonium persulfate solution, so that a one-piece structure comprising a multilayer structure of Pt separation layer 25/dielectric layer 30/Cu metal foil 40 (hereinafter called simply the "Pt/BST/Cu metal foil") separated naturally out of the silicon substrate 10 having a thermally oxidized film layer without the application of external force.

After the separation, the "Pt/BST/Cu metal foil" could be handled by itself. The Cu metal foil could function well as a support.

Then, a copper electrode layer of thickness 17 μm was formed by sputtering on the Pt side of the "Pt/BST/Cu metal foil", by electroplating in a copper sulfate bath with Pt as a cathode (the formation of electrode layer 50). In this case, for an early 5 minutes, the current density was set at 0.2 A/dm², and then brought up to 2 A/dm².

Then, photoresists were pasted on both surfaces of the assembly, and the respective patterns of both surfaces were pattern exposed to light through metal masks. After development, an ammonium persulfate solution was used to dissolve off unnecessary copper (partly unnecessary portions of the Cu metal layer 40 and Cu electrode layer 50).

In this way, there was a thin-film capacitor of about 35 μm in total thickness fabricated, wherein the electrodes on both sides were made of Cu with BST—perovskite ceramics—as the dielectric layer.

The total thickness of this thin-film capacitor was much the same as the standard thickness of a printed circuit board, and by using that thin-film capacitor in place of an ordinary interconnecting copper foil, it could be buried as a decoupling capacitor in an IC package board. The IC package with that decoupling capacitor built in it was much more improved in terms of high-frequency decoupling function over a conventional package with a chip capacitor outside.

There was none of damage to the dielectric layer by reason of copper etching, with yields of 99% or greater.

The fabrication cost involved only expenses taken for the formation of Pt sputtering (separation layer 25), the formation of dielectric layer 30, copper sputtering (a part of copper metal foil 40, copper plating (a part of metal foil 40 and electrode layer 50) and patterning, remaining low.

The capacity of the device per unit area was 4 μF/cm², and the impedance at 1 GHz, too, was Z=0.1Ω, figures indicative of satisfactory properties for a buried type capacitor.

It is here noted that when, at the time of sputtering (for separation layer 25), a 50-nm uniform film was all over the surface of silicon substrate 10, the metal foil 40 was often likely to come out of the outer periphery of the substrate 10 in the process of copper plating, resulting in a somewhat lowering of yields. However, when the metal mask was used for patterning to provide the slant 21 on each outer end of the separation layer 25 as in the aforesaid experimentation, there was none of separation occurring by the time of the separation step.

Comparative Example 2-1

In a state where a Cu layer of thickness 2 μm was formed by sputtering on the dielectric layer 30 formed as in Example 2-1, the "Pt/BST/Cu" structure could not be separated from the substrate.

Comparative Example 2-2

In a state where a further copper layer of thickness 3 μm was formed by electroplating on the dielectric layer 30 of Comparative Example 2-1 with a Cu layer of thickness 2 μm formed by sputtering as a cathode (5 μm copper electrode), a part of the "Pt/BST/Cu" structure could be separated from the substrate, but a substantial part of the "Pt/BST/Cu" structure remained on the substrate. The portion of the Pt/BST/Cu" structure that could be separated off, too, could not be handled by itself, failing to provide an electrode layer.

From the results of the aforesaid experiments, the advantages of the first invention would be undisputed.

That is to say, according to the second capacitor fabrication process of the invention comprising a separation layer formation step of forming a separation layer on one surface of a substrate a dielectric layer formation step of forming a dielectric layer on the separation layer, a metal foil formation step of forming a metal foil of 10 μm or more in thickness on the dielectric layer, a separation step of separating the substrate from the separation layer at an interface, and an electrode layer formation step of forming an electrode layer on the second surface of said dielectric layer separated off by said separation step via said separation layer, wherein the second surface faces away from the first surface of said dielectric layer with said metal foil formed thereon, it is possible to obtain at low costs and high yields a thin-film capacitor that has a higher capacity and a form well suited as a buried type capacitor having a reduced overall thickness, and can be used even at high frequencies. This advantage is achieved because, unlike a conventional capacitor having a dielectric layer and an electrode layer formed on a metal foil wherein the dielectric layer is formed on the metal foil readied up at first, the dielectric layer is first formed on the noble metal layer and the metal foil (in film form) is then formed thereon.

What is claimed is:

1. A capacitor fabrication process characterized by comprising:
   a separation layer formation including forming a separation layer on one surface of a substrate,
   a dielectric layer formation including forming a dielectric layer on said separation layer,
   a metal foil formation including forming a metal foil of 10 μm or more in thickness on a first surface of said dielectric layer,
   a separation including separating said substrate from said separation layer at an interface, and
   an electrode layer formation including forming an electrode layer on a second surface of said dielectric layer separated from the substrate by said separation wherein said second surface faces away from the first surface of said dielectric layer that is covered with said metal foil.

2. The capacitor fabrication process according to claim 1, wherein at said separation step, a one-piece assembly comprising said metal foil, said dielectric layer and said separation layer is separated from said substrate at an interface between said separation layer and said substrate.

3. The capacitor fabrication process according to claim 1, wherein said substrate is a silicon wafer having a thermally oxidized film, said separation layer is Pt, and a separating interface at said separation step is an interface between a thermally oxidized film layer on the silicon wafer and the separating interface comprising Pt.

4. The capacitor fabrication process according to claim 1, wherein the capacitor to be fabricated has a multilayer structure of said electrode layer, said separation layer, said dielectric layer and said metal foil.

5. The capacitor fabrication process according to claim 1, wherein said dielectric layer is a perovskite ceramic.

6. The capacitor fabrication process according to claim 1, wherein said electrode layer and said metal foil are each Cu.

7. The capacitor fabrication process according to claim 1, wherein said dielectric formation further includes firing the dielectric layer, after which said metal foil formation, said separation and said electrode formation are implemented in order.

8. The capacitor fabrication process according to claim 1, wherein the separation layer formation, the dielectric layer formation, the metal foil formation, the separation, and the electrode layer formation are carried out to form a capacitor in which the metal foil layer is directly adjacent to and in continuous contact with the dielectric layer and the dielectric layer is directly adjacent to and in continuous contact with the electrode layer.

9. The capacitor fabrication process according to claim 1, wherein the separation layer formation, the dielectric layer formation, the metal foil formation, the separation, and the electrode layer formation are carried out to form a capacitor in which the metal foil layer is directly adjacent to and in continuous contact with the dielectric layer, the dielectric layer is directly adjacent to and in continuous contact with the separation layer, and the separation layer is directly adjacent to and in continuous contact with the electrode layer.

10. The capacitor fabrication process according to claim 1, wherein the separation layer formation, the dielectric layer formation, the metal foil formation, the separation, and the electrode layer formation are carried out to form a capacitor in which the metal foil layer is directly adjacent to and in continuous contact with the dielectric layer, the dielectric layer is directly adjacent to and in partial contact with the separation layer, and the electrode layer is directly adjacent to the separation layer and in partial contact with the separation layer and the dielectric layer.

* * * * *